United States Patent
Murase

(10) Patent No.: US 6,388,994 B1
(45) Date of Patent: May 14, 2002

(54) TRAFFIC RATE CONTROLLER IN A PACKET SWITCHING NETWORK

(75) Inventor: Tutomu Murase, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/154,160

(22) Filed: Sep. 16, 1998

(30) Foreign Application Priority Data

Sep. 19, 1997 (JP) ............................................. 9-254401

(51) Int. Cl.[7] ................................................. H04J 3/24
(52) U.S. Cl. .................... 370/235; 370/395.4; 370/412; 370/428; 370/468
(58) Field of Search ................................ 370/229, 230, 370/235, 236, 395, 401, 402, 412, 413, 414, 415, 416, 417, 418, 462, 463, 465, 468, 395.2, 395.21, 395.4, 395.65, 428, 429

(56) References Cited

U.S. PATENT DOCUMENTS 5,339,317 A * 8/1994 Tanaka et al. ............... 370/462
5,953,336 A * 9/1999 Moore et al. ................ 370/395
6,072,772 A * 6/2000 Charny et al. ............... 370/229

FOREIGN PATENT DOCUMENTS

| JP | 4-342335 | 11/1992 | ........... H04L/12/44 |
|---|---|---|---|
| JP | 7-95238 | 4/1995 | ........... H04L/12/56 |
| JP | 7-250082 | 9/1995 | ........... H04L/12/28 |
| JP | 8-251170 | 9/1996 | ........... H04L/12/28 |

* cited by examiner

Primary Examiner—Douglas Olms
Assistant Examiner—Shick Hom
(74) Attorney, Agent, or Firm—Whitham, Curtis & Christofferson P.C.

(57) ABSTRACT

A packet switching network includes a transmitting station, an ATM switching system and a receiving station. The transmitting station has a traffic rate controller for controlling the traffic rate based on the congestion in the ATM switching system as well as the data cells stored in the transmission data storage section for receiving data for transmission. The traffic rate controller controls the number of transmitted cells between adjacent forward resource management (FRM cells, thereby avoiding a reduction in the traffic rate during data transmission which is caused by lack of available data for transmission supplied to the transmission station.

7 Claims, 4 Drawing Sheets

TRAFFIC RATE CONTROLLER IN A PACKET SWITCHING NETWORK

BACKGROUND OF THE INVENTION (a) Field of the Invention

The present invention relates to a taffic rate controller in a packet switching network and, more particularly, to an improvement of a traffic rate controller for controlling the traffic rate in a packet switching network by monitoring the data cells transmitted from a transmitting station.

(b) Description of the Related Art

A transmitting station in a packet switching network generally forwards data for transmission from a transmitting node to a receiving node after converting the data for transmission into packet cell data each having a fixed length. A relay node in the packet switching network relays the packet cell data based on the address of the receiving station attached to the packet cell data. In this configuration, the data can be transmitted at the traffic rates based on the respective species of the data transmitted.

On the other hand, with the increase in the amount and diversification of the transmission data, a high-quality processing of the transmission data has been demanded, which highlights the importance of avoidance or cancellation of congestion in the data traffic. A tic rate control in the packet transmission is known as one of the measures for avoiding or canceling the congestion.

A conventional traffic rate control technique in the packet switching network is described hereinafter with reference to an available bit rate (ABR) service technique used in an asynchronous transfer mode (ATM switching system. It should be noted, however, that another traffic rate control technique may be also used in the ATM switching system.

The ABR service technique used in the ATM switching system is recommended in an ATM forum, "Traffic Management Specification", Version 4.0 R11, March 1961 (hereinafter, referred to as TM4.0). A traffic rate controller implementing the ABR service technique uses an allowed cell rate (ACR) specified at the transmitting node and resource management cells. The traffic rate controller monitors the resource management cells to detect the congestion in the traffic, thereby controlling the traffic rate on the transmitting side by implementing a closed loop control.

FIG. 1 shows a block diagram of a packet switching network implementing a typical traffic rate control technique conformed with TM4.0, which operates based on the ABR service technique, in an ATM switching system. The packet switching network includes a transmitting station 401, a receiving station 402 and an ATM switching system 403. The transmitting station 401 is coupled to the receiving station 402 through one of ATM switches 404 distributed in the ATM switching system 403.

When the transmitting station 401 is to forward data 405 for transmission toward the receiving station 402, the transmitting station 401 first stores the data 405 temporarily in the transmission buffer 406, then forwards the stored data in the form of data cells 407. The data cells 407 are transferred by the ATM switches 404 to the transmitting station 402 based on the address attached to each data cell. The receiving station 402 stores the data cells thus transferred in the receiving buffer 408 and takes out the stored data as effective, received data 409 to complete the data transmission.

In the ABR technique as described above, the data cell 407 is forwarded from the transmitting station 401 together with a forward resource management (FRM) cell 410 attached thereto. The receiving station 402, after receiving the FRM cell 410 attached to the data cell 407, sends back the FRM cell as a backward resource management (BRM) cell 411 to the transmitting station 401.

An explicit rate calculating section 412 calculates an explicit rate (ER) which represents information of congestion in the traffic installed between the transmitting station 401 and the receiving station 402. ER adding sections 413 and 414 add the explicit rate, supplied from the ER calculating section 412, to the FRM cell 410 supplied from the transmitting station 401, and to the BRM cell 411 supplied from the receiving station 402, when the FRM cell 410 and the BRM cell 411 pass the ATM switches 404.

The explicit rate thus supplied is the maximum cell rate allowed by the ATM switching system 403 to the transmitting station 401 at that time for the transmission without involving a congestion in the connection effected by the ATM switch 404. The explicit rate thus includes a congestion information in the connection in the ATM switching system 403. If the present load on the connection is light, the ATM switching system 403 allows a higher traffic rate to the transmitting station 401, resulting in a higher explicit rate. On the other hand, if the present load on the connection is heavy, the ATM switching system 403 allows a lower traffic rate to the transmitting station 401, resulting in a lower explicit rate in the transmitting station 401.

The allowed cell rate (ACR) as mentioned before is the maximum traffic rate in the transmitting station 401, whereas the explicit rate is the maximum traffic rate determined by the ATM switching system 403. The transmitting station 401 controls the transmission rate thereof by the function of the traffic rate controller with reference to the explicit rate attached to the BMR cell by the ATM switch 404. That is, the transmitting station 401 transmits the data at the transmission rate obtained either by increasing/decreasing the ACR value in the transmitting station 401 based on the received explicit rate or by setting the received explicit rate on the ACR value itself.

The transmitting station 401 also operates for a time-out processing wherein the transmitting station 401 deceases its ACR value in a case other than the congestion in the ATM switching system 403. This case occurs when FRM cells are not forwarded at a threshold time interval therebetween, which is called ACR decrease time factor (ADTF). The FRM cells are not forwarded at the threshold time interval ADTF in an idle state or a light-load state of the transmitting station 401, wherein the transmitting station 401 has a smaller number of available data cells for transmission per unit time length.

The threshold ADTF is introduced for the purpose of not applying an excessive sudden load to the network at the restart of the transmission after the transmitting station 401 stays in an idle state, for example, in view that a higher tic rate is not generally required at the restart due to the prior buffering of the data for transmission in the transmission buffer 406. Immediately after the time-out processing, the transmitting station starts for transmission of data at an initial cell rate (ICR), which is provided in the specification as an initialization of ACR for the operation of the transmitting station 401.

It is provided in the specification as the condition for the cell transmission that a FRM cell be attached with a fixed number "G" of data cells. That is, if there is only a small number of available data cells for transmission in the transmitting station 401, the rate of FRM cells is low The transmitting station effects initialization of ACR value at ICR based on the lower rate of FRM cells.

In the conventional traffic rate controller as described above, there is a problem in that the ACR value initialized in the transmitting station lowers the throughput of the traffic, especially in the case of a low-load state of the packet switching network, because the initial traffic rate ICR is extremely low.

There is another problem in the case of an application software specifying that a transmission be conducted at a time interval (jj) which is larger than the specified ADTF time (tt). In this case, even if the time interval is only slightly larger than the ADTF, (for example, even in the case of jj=101 for tt=100), the time-out procedure is conducted without fail to set the ICR on the ACR value, thereby starting the transmission at the low ICR value. Especially in the case of the ABR service technique, the amount of packet data changes at a large change rate, which lowers the throughput of the traffic, resulting in an inefficient transmission.

In order to avoid a congestion in the network caused by a sudden start of the transmission, some tic rate controllers have a function for transmitting packet dummy cells before the start of the data transmission, the dummy cells having no significance in terms of received data in the receiving station 402.

JP-A-7(1995)-95238 proposes a packet transmitter having such a traffic rate controller for use in a network system wherein a rapid increase in the traffic rate is not allowed. The packet transmitter first transmits packet dummy cells before the start of transmission, increasing the traffic rate of the packet dummy cells at the rate of change specified in the system to thereby obtain a sufficient traffic rate at the effective data cell transmission from the start thereof. The packet transmitter also transmits the dummy cells when an effective data cells are not supplied during a transmission.

In the conventional packet transmitter as described above, the packet transmitter forwards the dummy cells by forecasting the start of the transmission. This causes a problem in that the technique does not apply to the data transmission the start of which cannot be forecasted beforehand. In this case, the dummy cells can be only transmitted after detecting the command for transmission or the supply of data for transmission, which involves a larger time length before a sufficient high traffic rate is obtained.

SUMMARY OF THE INVENTION

In view of the above, it is an object of the present invention to provide a traffic rate controller in a packet switching system, which is capable of achieving a high traffic rate by avoiding setting of an ICR on the ACR value with a simple structure.

The present invention provides a taffic rate controller in a packet switching network comprising a transmitting station having a transmission data storage section for storing effective data cell therein and a transmission buffer for transmitting packet cells, a receiving station for receiving the packet cells, and a traffic rate controller for controlling a traffic rate in transmission between the transmitting station and the receiving station, the traffic rate controller including a data monitor for identifying each of the packet cells as a data cell or a resource management cell, a timer section for counting a time length elapsed since a last resource management cell is delivered from the transmission buffer, the timer section generating a trigger signal after counting a specified time length, a counter for counting a number of data cells delivered from the transmission buffer since the last resource management cell is delivered, a dummy cell supplier for responding to the trigger signal to supply dummy cells in number based on a count by the counter, a selector for selecting the effective data cells or the dummy cells as the packet cells to be stored in the transmission buffer based on the number of effective data cells stored in the transmission data storage section.

In accordance with the traffic rate controller of the present invention, a time-out procedure for setting an ICR on the ACR value is not conducted in the traffic rate controller during a data transmission wherein a sufficient number of data cells are not supplied to the transmitting station, resulting in a higher traffic rate and an efficient transmission.

PREFERRED EMBODIMENTS OF THE INVENTION

Now, the present invention is more specifically described with reference to accompanying drawings.

Figure 1:
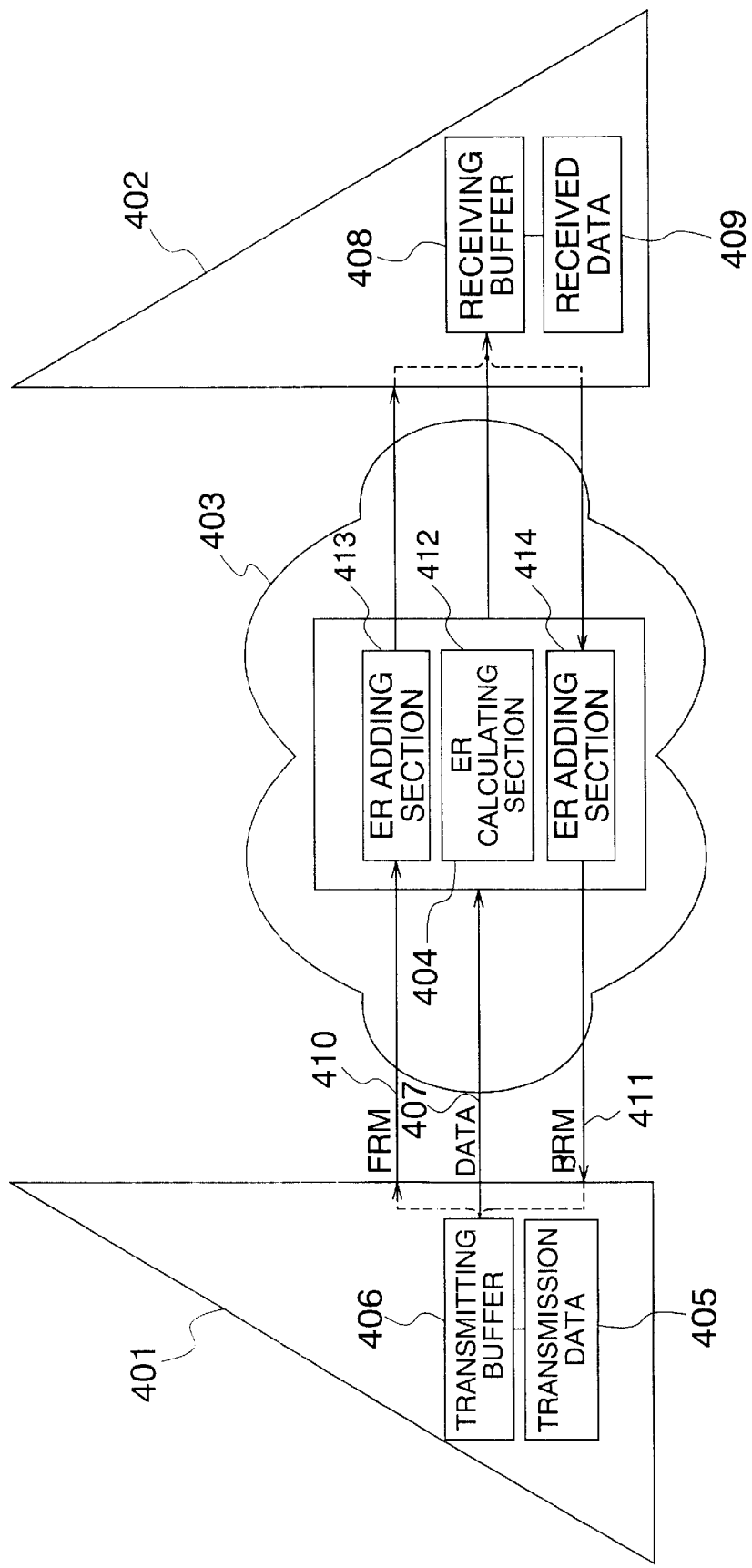
FIG. 1 is a block diagram of a packet switching network having a conventional traffic rate controller.
Figure 2:
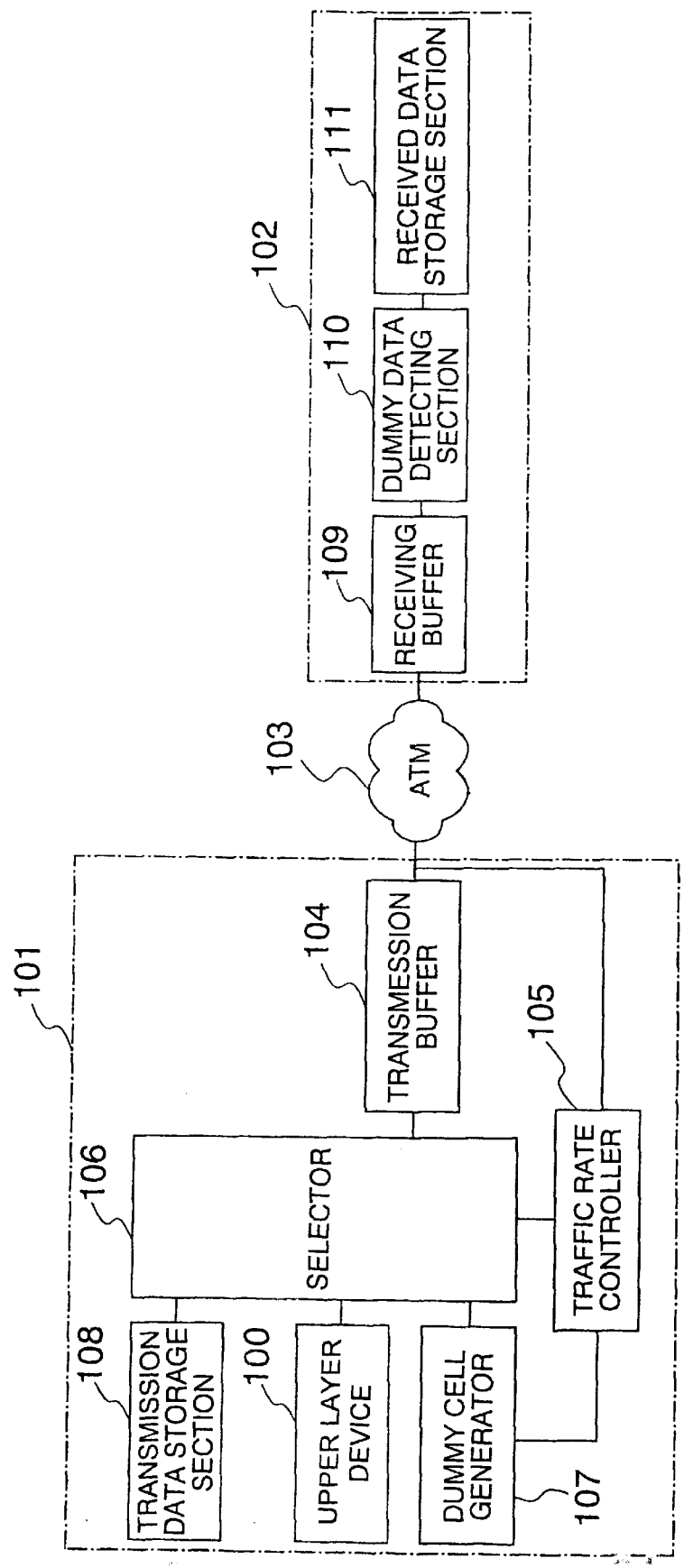
FIG. 2 is a block diagram of a packet switching network having a traffic rate controller according to an embodiment of the present invention.

Referring to FIG. 2 showing a packet switching network including a traffic rate controller according to an embodiment of the present invention, the traffic rate controller uses the ABR service technique in an ATM switching system, one of packet switching network systems. The packet switching network illustrated includes a transmitting station 101, a receiving station 102, and an ATM switching system 103, the functions of which are similar to those as described with reference to FIG. 1 except for the additional function of a traffic rate controller 105.

The transmitting station 101 includes a transmission buffer 104, the traffic rate controller 105 as mentioned above, a selector 106, a dummy data generator (dummy cell supplier) 107 and a transmission data storage section 108. The transmission data storage section 108 receives effective data for transmission (or effective transmission data), stores the effective transmission data, and delivers the same to the selector 106. The dummy data generator 107 generates dummy cells based on a control signal supplied from the traffic rate controller 105, and delivers the same to the selector 106. The selector 106 selects the effective transmission data, if any, from the transmission data storage section 108 or selects the dummy data from the dummy data generator 107, if there is no available effective data stored in the transmission data storage section 108, to supply the selected data to the transmission buffer 104.

The selected data cells are delivered from the selector 106 to the transmission buffer 104, which temporarily stores the selected data supplied from the selector 106 to forward the same to the receiving station 102 through the ATM switching network 103. The traffic rate controller 105 monitors the data forwarded from the transmission buffer 104 and generates the control signal for the dummy data generator 105 based on the data forwarded from the transmission buffer 104. In the illustrated embodiment, the traffic rate controller 105 is installed in the transmitting station 101, as described above. However, the traffic rate controller according to the present invention may be installed in any of the terminal stations 101 and 102 and relaying stations such as ATM switching system 103.

The receiving station 102 includes a receiving buffer 109 for receiving and storing the data supplied from the transmitting station 101 through the ATM switching system 103, a dummy data detector 110 for detecting the dummy cells among the received data stored in the receiving buffer 109 and discarding the dummy cells from the received data to deliver effective data, and an effective data storage section 111 for temporarily storing the effective data supplied from the dummy data detector 110.

Figure 3:
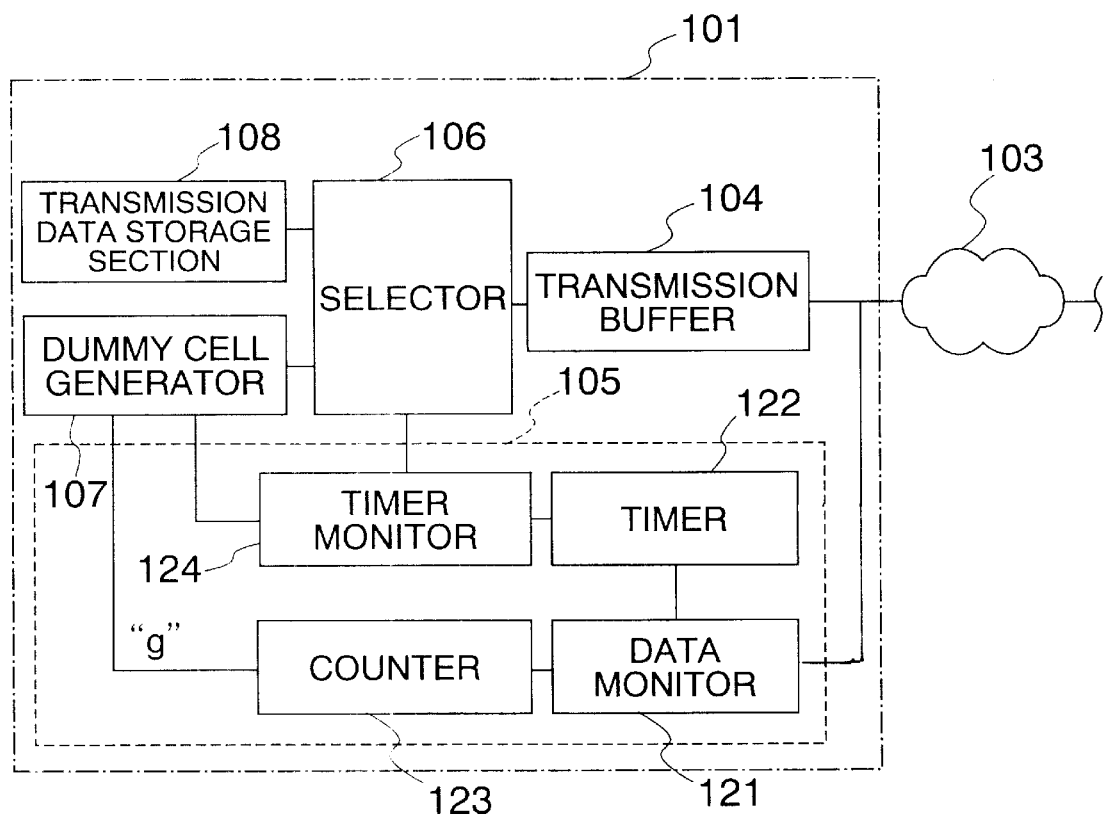
FIG. 3 is a detailed block diagram of the transmitting station shown in FIG. 2.

Referring to FIG. 3 showing the detail of the traffic rate controller 105 in the transmitting station 101 shown in FIG. 2, the traffic rate controller 105 includes a data monitor 121, a timer 122, a counter 123, and a timer monitor 124. The data monitor 121 monitors the data cells delivered from the transmission buffer 104, and identifies the data cells as FRM cells or a data cells including effective data cells and dummy cells. The counter 123 counts the number "g" of data cells delivered from the transmission buffer 104 after a last FRM cell is delivered. That is, the counter 123 is reset or initialized each time a FRM cell is forwarded from the transmission buffer 104 based on the signal from the data monitor 121. The timer 122 is also reset by a FRM cell, and therefore counts the time length since the last FRM cell is forwarded. The timer 122 and the timer monitor 124 may be formed as a single element.

The timer monitor 124 monitors at any time the time length counted by the time 122, outputs a trigger signal to the dummy cell generator 107 when the time length counted by the timer 122 is ttd wherein "tt" is the time length specified as a time-out length in the system and "d" is a fixed small time length. The time-out length "tt" is determined as a time interval specified between two of FRM cells. The time length "d" corresponds to a time interval between the time instant when the timer delivers a trigger signal and the time instant when the first dummy cell is delivered from the transmission buffer 104 via the selector 106. The dummy cell generator 107 also receives a count signal from the counter 123 in response to the trigger signal to generate dummy cells therein.

The timer monitor 124 monitors the count in the timer 122, and may detect the time instant at which time length "tt" elapsed since the last FRM cell is delivered. The latter function is not used, however, in the present embodiment, but used when the traffic rate controller 105 according to the embodiment is used in a conventional transmitting station. If the timer monitor 124 detects that a time length "tt" has elapsed since the output of a last FRM cell in the conventional transmitting station, the transmitting station lowers the traffic rate from a higher ACR value to the lower ICR value for avoiding congestion at the restart of the transmission in the network In the present embodiment, however, since the dummy cell generator 107 generates a dummy cell after the time length ttd elapsed since the output of the last FRM cell, the function for conducting a time-out procedure is not used in the present embodiment.

The dummy cell generator 107 generates dummy cells in number based on the count "g" in the counter 123 which is received in response to the trigger signal supplied from the timer monitor 124. Identification of a dummy cell or an effective data cell should be agreed beforehand between the transmitting station 101 and the receiving station 102. For example, if a payload type (PT) field, which is generally defined as a three-bit ATM header of a packet cell, has a value "111", the packet cell is identified as a dummy cell, whereas if the PT cell has a value other than "111", such as "001" or "010", the packet cell is regarded as an effective packet cell. This information is notified from the transmitting station 101 to the receiving station 102. In is agreement, the dummy cell may have a suitable bits in the payload section defined for the ATM cell and have "111" bits in the PT field of the ATM header.

In the present embodiment assuming that a FRM cell is to be forwarded after transmission of data cells in a fixed number "G", including effective data cells and dummy cells, delivered since the delivery of a last FRM cell, the dummy cells are generated in number of S=G-g by the dummy cell generator 107. In this configuration, if an available data cell is not stored in the transmission data storage section 108, the selector 106 selects the dummy cells in number corresponding to the number of S=G-g. If sufficient number of available data cells are stored in the transmission data storage section 108, the selector 107 selects the stored data, and the dummy cells are discarded in the dummy cell generator 107. The number "G" may be the number specified beforehand as a maximum number of dummy cells to be generated instead.

Figure 4:
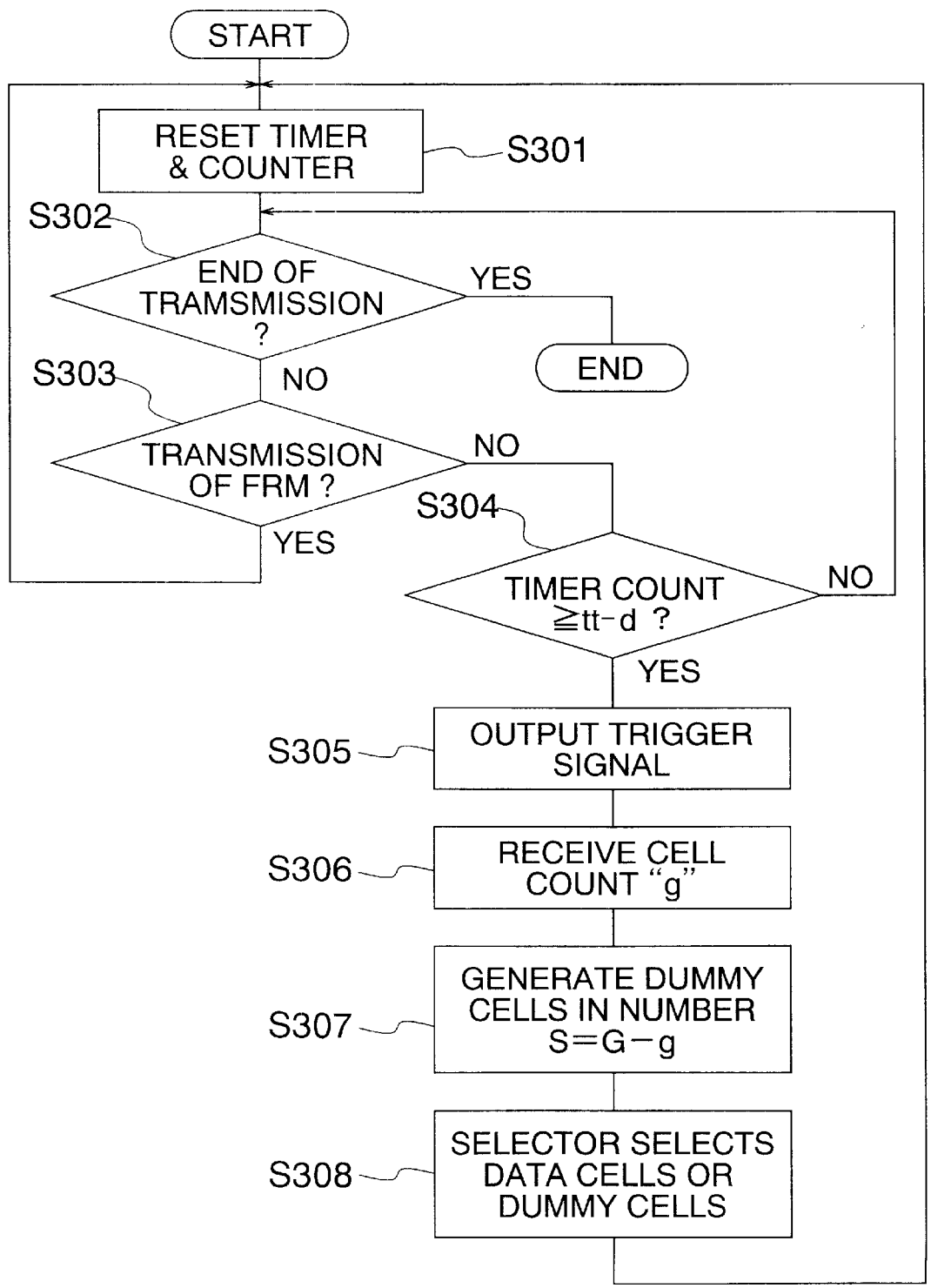
FIG. 4 is a flowchart of the operation by the traffic rate controller in the transmitting station of FIG. 3.

Referring to FIG. 4 showing the operation of the traffic rate controller 105 shown in FIG. 3, when the traffic rate controller 105 starts for controlling, the timer 122 and the counter 123 are reset to start for counting (step S301). The data monitor 121 monitors the data cells forwarded from the transmission buffer 104. If an end of transmission is detected at step S302 by the end of data cells from the transmission buffer 104 or any other input signal the procedure for the traffic rate control 105 is ended, resulting in an idle state of the traffic rate controller 105. If the transmission continues at step S302, it is ether detected whether the present data cell forwarded is a FRM cell or a data cell at step S303. If the transmitted cell is a FRM cell, then the process returns to step S301 to reset the timer 122 and the counter 123 for restart of the counting, thereby preparing for a next generation of data cells.

If it is judged at step S303 that the present data cell is not a FRM cell, the counter 123 counts up the data cell, and the timer monitor 124 judges whether the time length counted by the timer 122 exceeds tt-d at step S304. If the time length counted by the timer 122 is smaller than tt-d, the process returns to step S302 to repeat the above steps, and the transmitting station 101 continues for delivering the data cells, which are counted by the counter 123.

If it is judged at step S304 that the time length counted by the timer 122 has exceeded tt-d, the timer monitor 121 delivers a trigger signal to the dummy cell generator 107 at step S305. The dummy cell generator 107, by responding to the trigger signal, receives the count "g" from the counter 123 at step S306. The dummy cell generator 107 then generates dummy cells in number equal to S=G-g at step S307. If there is no available data cell stored in the transmission data storage section 108, the dummy cells thus generated are consecutively selected by the selector 106 and delivered to the transmission buffer 104 through the selector 106, then to the receiving station 102 through the ATM switching system 103 at step S308. If there is a sufficient number of available data cells stored in the transmission data storage section 108, the selector 106 selects the stored data, and the dummy data generator 107 discards the dummy cells. If there is a small number (g1) of data cells stored in the transmission data storage section 108, wherein g1<S, the selector 106 first selects the stored data cells and then dummy cells in number corresponding to S-g1.

The process then returns to step S301 wherein the traffic rate controller prepares for next generation of data cells, with the timer 122 and the counter 123 being reset for starting to repeat the above operation.

As described above, the traffic rate controller according to the present embodiment maintains a specified traffic rate (ACR) so long as the transmission continues, by avoiding a time-out procedure which lowers the traffic rate down to an ICR value. Accordingly, a high traffic rate can be obtained. The taffic rate controller 105 is controlled also by the ATM switching system 103 based on a congestion therein, similarly to the case of the conventional packet switching network.

Since the above embodiments are described only for examples, the present invention is not limited to the above embodiments and various modifications or alterations can be easily made therefrom by those skilled in the art without departing from the scope of the present invention.

For example, other data equivalent to the dummy cells may be generated by an upper layer device 100 in the communication protocol or a procedure operating on a software instead of the dummy cell generator. Or else, the traffic rate controller may generate the dummy cells only after the supply of such data from the upper layer device 100 or application software is not satisfied. In addition, the timer need not be reset at the instant when a FRM cell is delivered so long as the time interval between deliveries of adjacent FRM cells can be counted.

What is claimed is:

1. A packet switching network comprising:
   a transmitting station having a transmission data storage section for storing effective data cells therein and a transmission buffer for transmitting packet cells;
   a receiving station for receiving, said packet cells; and
   a traffic rate controller for controlling a traffic rate in transmission between said transmitting station and said receiving station, said traffic rate controller including:
      a data monitor for identifying each of said packet cells as a data cell or a resource management cell;
      a timer section for counting a time length elapsed since a last resource management cell is delivered from said transmission buffer, said timer section generating a trigger signal after counting a specified time length;
      a counter for counting a number of data cells delivered from said transmission buffer since said last resource management cell is delivered;
      a dummy cell supplier for responding to said trigger signal to supply dummy cells in number based on a count by said counter;
      a selector for selecting said effective data cells or said dummy cells as said packet cells to be stored in said transmission buffer based on the number of effective data cells stored in said transmission data storage section.

2. The packet switching network as defined in claim 1, wherein said traffic rate controller is installed in said transmitting station.

3. A packet switching network comprising:
   a transmitting station having a transmission data storage section for storing effective data cells therein and a transmission buffer for transmitting packet cells;
   a receiving station for receiving said packet cells; and
   a traffic rate controller for controlling a traffic rate in transmission between said transmitting station and said receiving station, said traffic rate controller including:
      a data monitor for identifying each of said packet cells as a data cell or a resource management cell;
      a timer section for counting a time length elapsed since a last resource management cell is delivered from said transmission buffer, said timer section generating a trigger signal after counting a specified time length;
      a counter for counting a number of data cells delivered from said transmission buffer since said last resource management cell is delivered;
      a dummy cell supplier for responding to said trigger signal to supply dummy cells in number based on a count by said counter;
      a selector for selecting said effective data cells or said dummy cells as said packet cells to be stored in said transmission buffer based on the number of effective data cells stored in said transmission data storage section,
   wherein said dummy cell supplier generates said dummy cells in number corresponding to a difference between a fixed number and said count counted by said counter.

4. The packet switching network as defined in claim 3, wherein said fixed number is specified in said network as a number of cells to be delivered between adjacent resource management cells.

5. The packet switching network as defined in claim 1, wherein said transmitting station notifies said receiving station of information for identifying said dummy cells.

6. The packet switching network as defined in claim 1, wherein said dummy cell supplier requests transmission of said dummy cells from an upper layer device in a communication protocol.

7. A packet switching network comprising:
   a transmitting station having a transmission data storage section for storing effective data cells therein and a transmission buffer for transmitting packet cells;
   a receiving station for receiving said packet cells; and
   a traffic rate controller for controlling a traffic rate in transmission between said transmitting station and said receiving station, said traffic rate controller including:
      a data monitor for identifying each of said packet cells as a data cell or a resource management cell;
      a timer section for counting a time length elapsed since a last resource management cell is delivered from said transmission buffer, said timer section generating a trigger signal after counting a specified time length;
      a counter for counting a number of data cells delivered from said transmission buffer since said last resource management cell is delivered;
      a dummy cell supplier for responding to said trigger signal to supply dummy cells in number based on a count by said counter;
      a selector for selecting said effective data cells or said dummy cells as said packet cells to be stored in said transmission buffer based on the number of effective data cells stored in said transmission data storage section,
   wherein said dummy cell supplier requests transmission of said dummy cells from an upper layer device in a communication protocol,
   wherein said dummy cell supplier generates said dummy cells when said upper layer device does not supply said dummy cells.

* * * * *